Nov. 21, 1939.   F. W. BERWICK ET AL   2,180,702
DEVICE FOR DELIVERING MEASURED QUANTITIES OF LIQUID
Filed Nov. 29, 1937   2 Sheets-Sheet 1
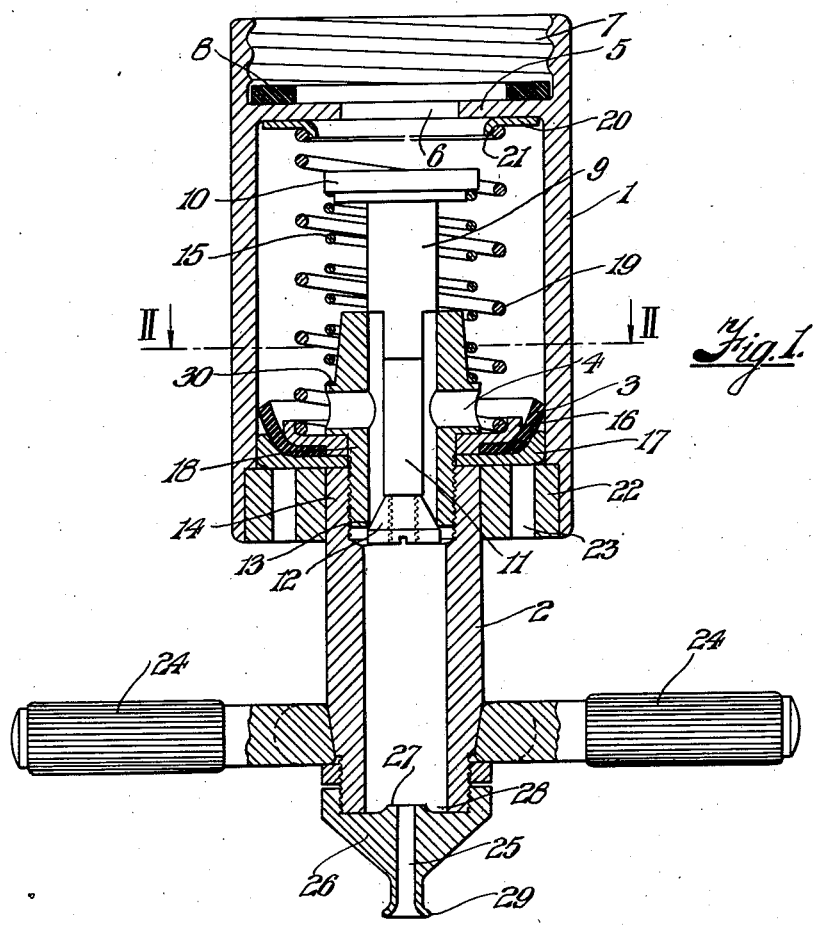
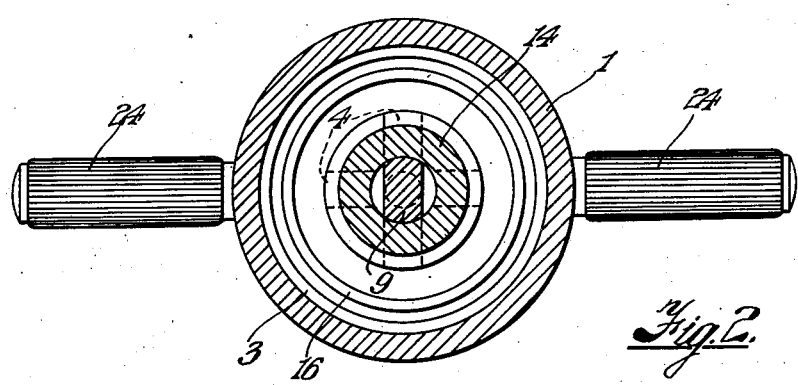
INVENTORS
FREDERICK W. BERWICK
ALBERT G. BERWICK
BY Norris & Bateman
ATTORNEYS Nov. 21, 1939.   F. W. BERWICK ET AL   2,180,702
DEVICE FOR DELIVERING MEASURED QUANTITIES OF LIQUID
Filed Nov. 29, 1937   2 Sheets-Sheet 2

INVENTORS
FREDERICK W. BERWICK
ALBERT G. BERWICK
BY Norris & Bateman
ATTORNEYS

Patented Nov. 21, 1939

2,180,702

UNITED STATES PATENT OFFICE 2,180,702

DEVICE FOR DELIVERING MEASURED QUANTITIES OF LIQUID

Frederick William Berwick and Albert George Berwick, Streatham, London, England, assignors, by mesne assignments, to The De Laval Separator Company, New York, N. Y., a corporation of New Jersey Application November 29, 1937, Serial No. 177,146
In Great Britain February 3, 1937

6 Claims. (Cl. 221—102)

This invention relates to devices for delivering measured quantities of liquid and to those of the kind wherein a piston or plunger is utilised to eject a quantity of liquid from a cylindrical chamber. The invention has particular although not exclusive reference to the delivery of measured quantities of oil and similar viscous liquids and has for its object to provide a device which is designed to overcome certain difficulties which have been experienced in the delivery of measured quantities of such liquids and which will effectively prevent leakage into and out of the measuring chamber and ensure that an exact predetermined quantity of liquid will be supplied at each operation of the device.

According to the invention a device for delivering measured quantities of liquid is provided comprising a measuring chamber and an operating member movable axially of said measuring chamber and adapted when operated to close the inlet to said chamber and thereafter to force liquid out of said chamber through a passage in said operating member to an outlet at its outer end.

According to a preferred form of the invention a device for delivering measured quantities of liquid comprises a measuring chamber, an axially movable valve operating member therein and means extending through the base of the device for actuating said operating member by upward or inward pressure wherein said operating member carries means for closing the liquid inlet to the measuring chamber, a piston and a valve controlled outlet all arranged so that after closure of the said inlet the piston is moved relatively to the closure member and the valve opened to force the measured quantity of liquid through an outlet in the operating member.

According to another feature of the invention a device for delivering measured quantities of liquid comprises a measuring chamber and an operating member movable axially therein to close the liquid inlet to said chamber and thereafter force the liquid out of the said chamber through a passage in the operating member which carries a piston embodying a resilient or flexible disc mounted so that it makes edge or line contact with the wall of the measuring chamber.

Reference will now be made to the accompanying drawings which illustrate by way of example a construction according to the invention and in which:

Fig. 1 is a sectional elevation showing the improved liquid measuring device with the parts in the inoperative position;

Fig. 2 is a sectional plan taken on the line II—II of Fig. 1;

Figure 3:
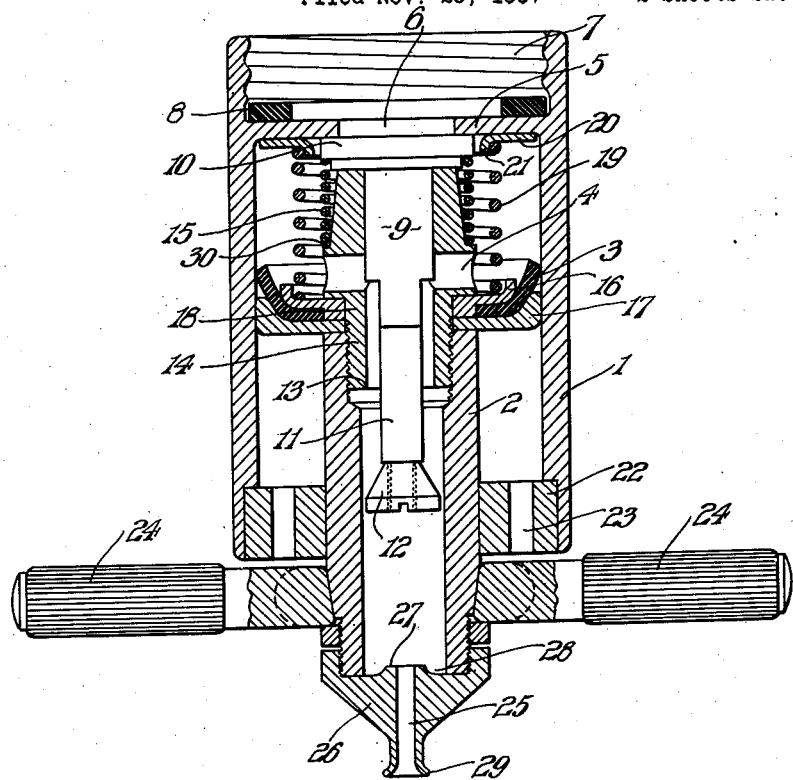
Fig. 3 is a sectional elevation similar to Fig. 1 but showing the parts at the completion of operation and Fig. 4 is a detail view of the valve member.
Figure 4:
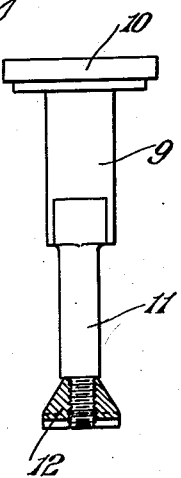

In the construction illustrated the improved device for delivering measured quantities of liquid comprises a measuring chamber 1 which in the construction shown is a metal cylinder but which may be formed of glass or other material or may have glass panels inserted.

Axially movable through the lower end of the said measuring chamber is a hollow cylindrical operating member 2 which carries within the said chamber a piston embodying a disc or cup washer 3 of india rubber or other resilient or flexible material. The interior of the operating member 2 communicates with the interior of the measuring chamber through laterally directed ports 4 formed in a detachable upper portion 14. The upper portion of the measuring chamber is closed by a cover 5 having a central inlet aperture 6 above which the walls of the measuring chamber are continued as a socket 7 into which the mouth or outlet of a liquid receptacle can be temporarily secured. This socket may be formed with an internal screw thread as shown or it may be screw threaded externally and it is preferably provided with a washer 8 to facilitate a fluid tight joint being made between it and the outlet from the receptacle. This part of the apparatus, however, is subject to considerable modification in accordance with the size and general character of the liquid receptacle to which the measuring device is to be attached.

Mounted within the open upper portion 14 of the operating member 2 is a valve stem 9 which carries at its upper end a disc valve 10 which in its uppermost position, as hereinafter described, closes the inlet 6. The valve stem 9 has a portion 11 of reduced diameter so as to permit, in all positions, free communication between the interior of the measuring chamber 1 and the interior of the upper portion 14 of the operating member. The lower end of the valve stem 9 carries a valve member 12 which normally seats, as shown in Fig. 1, on a valve seating 13 formed within the operating member 2 and preferably at the lower end of the upper portion 14 which is screw threaded into the hollow sleeve 2. A spring 15 disposed between the valve member 10 and a shoulder 30 on the portion 14 of the operating member urges the said valve in a direction towards its seating but the valve is normally prevented from moving above the position shown in Fig. 1 by engagement of the valve member 12 with its seating 13.

The piston consists of the annular disc of india rubber or other material 3 which is disposed between metal flanges or collars 16 and 17 mounted around a recessed portion 18 of the upper portion 14 of the operating member and secured in position by screwing the lower portion 2 on to the upper portion 14. The lower flange 17 is of larger diameter than the upper flange and each flange has an upwardly extending rim so that when the disc 3 has been positioned between the two flanges the shape of the upwardly bent rims causes the annular disc to be bent upwards until it assumes a frusto-conical formation as shown in Fig. 1. Alternatively, the disc 3 may be preformed to a frusto-conical shape. In this arrangement the upper edge only of the disc makes contact with the wall of the measuring chamber and the diameter of the disc is such that when assembled before insertion in the said chamber it is greater than the diameter of the interior of the chamber. This arrangement possesses the advantage, particularly when using a glass walled measuring chamber, that the india rubber disc 3 will accommodate itself automatically to any irregularities of shape in the measuring chamber whilst the fact that it only makes edge contact with the inner wall of the chamber will prevent it binding thereon under pressure of liquid whilst making fluid tight contact in all positions. Furthermore, when used with liquids which tend to swell india rubber, the swelling of the disc 3 will only tend to force its outer edge into closer contact with the wall of the chamber and will not cause surface contact to any appreciable extent.

The piston is normally maintained in the inoperative position by means of a spring 19 which rests upon the flange 16 and at its upper end bears against an annular disc 20 disposed at the top of the measuring chamber and formed with a downwardly extending inner lip 21 which prevents displacement of the spring. Alternatively, the disc 20 can be dispensed with and the lip 21 formed in the cover 5 of the measuring chamber.

The base 22 of the measuring chamber which is detachable to permit assembly of the piston therein is formed with air inlets 23 which prevent the formation of a vacuum below the piston as it rises on its delivery stroke. The operating member 2 is preferably provided, externally of the measuring chamber, with two or more laterally extending arms 24 or with a disc so as to be operated by upward pressure of a receptacle to be filled. The exterior of the operating member may also be provided with a collar adapted to come into contact during the delivery stroke with the base of the measuring chamber and thus limit the extent of the stroke to determine the amount of liquid to be delivered, and by arranging for the collar to be adjustable in position, the amount to be delivered at each operative stroke may be varied.

The lower open end of the operating member is provided with a constricted outlet aperture 25 formed in a detachable nozzle 26, the upper or inner portion of this outlet being surrounded by an annular lip 27 and an annular channel 28 which collects any drips falling down the inner walls of the operating member 2 after the delivery of a measured quantity of liquid. The outlet 25 terminates in an outwardly flared lip 29 at its lower end provided to prevent the formation of drips on the lower end of the outlet immediately after the discharge of a measured quantity of liquid. The outwardly flaring lip 29 enables the suction created by the return movement of the piston to withdraw any surplus liquid into the interior of the operating member where it is retained by the annular lip 27 and channel 28.

In the operation of the device above described the upward movement of the operating member 2 first brings the inlet closure valve 10 into position to close the inlet 6. Thereafter, the operating member 2, 14 moves relatively to the valve stem 9 so that the seating 13 is lifted above and away from the valve member 12. In this manner the outlet is opened so that the continued upward movement of the piston will force liquid from the interior of the measuring chamber through the ports 4 and into the interior of the operating member to be discharged through the outlet 25. At the conclusion of the operative stroke the parts are in the position shown in Fig. 3.

When the measured quantity of liquid has been delivered into a receptacle the upward pressure on the operating member 2 is relaxed so that the springs 15 and 19 are free to force the piston downwards and move the valve stem 9 into a position in which the valve 12 is again brought into contact with its seating 13. The suction produced by the downward movement of the piston causes an inflow of air through the ports 4 in the operating member to the interior of the upper portion of the measuring chamber which air is subsequently displaced by a fresh charge of liquid which enters through the inlet 6 from the reservoir. The spring 15 retains the inlet 6 closed until the operating member reaches a position in which the seating 13 engages the valve member 12 and withdraws the valve member 10 from the inlet. In this manner escape of any of the incoming fresh charge through the operating member 2 is prevented.

The invention is more particularly designed for delivering measured quantities of liquids such as oil as the pressure exerted by the upward movement of the piston will positively eject from the measuring chamber the oil whose natural viscosity would tend to prevent complete evacuation of the measuring chamber by gravitational methods.

We claim:—

1. A device for delivering measured quantities of liquid comprising a measuring chamber, an operating member movable axially within said measuring chamber and having an outlet passage extending axially therethrough to an outlet at its outer end, a valve member slidably guided in the inner end of the outlet passage in said operating member and having a valve on its inner end adapted to close the inlet to said chamber, and a piston mounted on said operating member to force liquid out of the said chamber through said passage in the operating member to the outlet at the outer end thereof.

2. A device for delivering measured quantities of liquid comprising a measuring chamber, a tubular axially movable operating member therein extending through a wall of said chamber for actuation by inward pressure and having outlet ports and an outlet passage extending axially therethrough to its outer end, a valve seat member in the inner end of said operating member, a valve member guided in said valve seat member and having a valve on its inner end for closing the inlet to said measuring chamber, a piston mounted on said operating member for forcing liquid from said chamber, and a valve on the outer end of said valve member and cooperable with said valve seat member for controlling the outlet passage through said operating member.

3. A device for delivering measured quantities of liquid comprising a measuring chamber, an operating member movable axially in said chamber and having a discharge passage therein and means to close the liquid inlet to said chamber, said member being operable to cause said means to close the liquid inlet to said chamber and to thereafter force the liquid out of said chamber through said passage in the operating member, and a piston carried by said operating member and embodying a resilient disc mounted so that its edge only engages and makes a line contact only with the wall of the measuring chamber.

4. A device for delivering measured quantities of liquid according to claim 3, wherein said piston consists of a cupped disc of resilient material of frusto-conical form mounted between two discs fixed around the operating member and which maintain the resilient disc in a position in which its edge only engages and makes a line contact with the interior wall of the measuring chamber.

5. A device for delivering measured quantities of liquid comprising a measuring chamber, a hollow tubular operating member vertically movable axially in said chamber and projecting through the base thereof and having an outlet at its lower end, means for connecting said measuring chamber to a source of liquid supply, a piston carried by said operating member and including a resilient element making line contact with the wall of the chamber, a valve movably mounted in the upper end of the operating member for closing the inlet to said chamber, a valve stem depending from said valve, a second valve carried by said stem for closing the outlet in the operating member, the operating member having lateral ports providing communication between said outlet and the interior of the measuring chamber, a spring opposing the operative movement of said piston, and a spring for normally holding said second valve closed and for holding the inlet valve closed after the initial upward movement of the operating member.

6. A device for delivering measured quantities of a fluid comprising a measuring chamber having an inlet, a tubular operating member movable axially in said chamber and having a passage extending axially therethrough and providing an outlet at its outer end, a valve member slidably fitting in and guided by said passage in the operating member, a valve on the inner end of said valve member and operable by inward movement thereof to close the inlet to said chamber, a valve on said valve member within said passage for closing the outlet portion thereof when said operating member is moved outwardly, and a piston including a cupped disk mounted on the operating member, and means on the operating member maintaining said cupped disk in a position in which its peripheral edge only engages and makes a line contact with the interior wall of the measuring chamber.

FREDERICK WILLIAM BERWICK.
ALBERT GEORGE BERWICK.